United States Patent
Sudano et al.

(10) Patent No.: US 7,968,224 B2
(45) Date of Patent: Jun. 28, 2011

(54) THIN FILM ELECTROCHEMICAL CELL FOR LITHIUM POLYMER BATTERIES AND MANUFACTURING METHOD THEREFOR

(75) Inventors: Anthony Sudano, Laval (CA); Tadeusz Borys, Longueuil (CA)

(73) Assignee: Bathium Canada Inc., Boucherville (CA)

( * ) Notice: Subject to any disclaimer, the term of this patent is extended or adjusted under 35 U.S.C. 154(b) by 28 days.

(21) Appl. No.: 12/425,700

(22) Filed: Apr. 17, 2009

(65) Prior Publication Data

US 2009/0208833 A1  Aug. 20, 2009

Related U.S. Application Data

(63) Continuation of application No. 10/968,933, filed on Oct. 21, 2004, now Pat. No. 7,531,012.

(51) Int. Cl.
*H01M 2/18* (2006.01)
*H01M 4/00* (2006.01)

(52) U.S. Cl. .................... 429/128; 429/130; 429/162

(58) Field of Classification Search .................. 429/161, 429/162, 127, 128, 300, 301, 302, 303, 129, 429/130

See application file for complete search history.

(56) References Cited

U.S. PATENT DOCUMENTS

| 5,376,210 | A | 12/1994 | Brochu et al. |
| 5,456,000 | A | 10/1995 | Gozdz et al. |
| 6,134,773 | A | 10/2000 | Kejha |
| 6,617,074 | B1 * | 9/2003 | Watarai et al. ............ 429/161 X |
| 7,700,019 | B2 | 4/2010 | Lavoie et al. |

FOREIGN PATENT DOCUMENTS

| EP | 1076371 | * | 2/2001 |
| WO | 9708769 A1 | | 3/1997 |
| WO | 9812765 A1 | | 3/1998 |
| WO | 2004051769 A2 | | 6/2004 |

OTHER PUBLICATIONS

International Search Report of PCT/CA2005//001621, Jan. 26, 2006, Laurent De Camprieu.
European Search Report of EP05799219, The Hague, Jul. 8, 2008, Andree Schwake.

\* cited by examiner

*Primary Examiner* — Stephen J. Kalafut
(74) *Attorney, Agent, or Firm* — Osler, Hoskin & Harcourt LLP

(57) ABSTRACT

An electrochemical cell sub-assembly and a method for manufacturing same. The electrochemical cell sub-assembly includes a current collector sheet having a pair of opposite surfaces and a pair of opposite edges, each surface being coated with a respective layer of electrode material. A layer of polymer electrolyte envelopes both layers of electrode material and one of the pair of edges of the current collector sheet, thereby encapsulating the one edge of the current collector sheet while leaving exposed the other edge of the current collector sheet.

5 Claims, 11 Drawing Sheets

THIN FILM ELECTROCHEMICAL CELL FOR LITHIUM POLYMER BATTERIES AND MANUFACTURING METHOD THEREFOR

CROSS-REFERENCE TO RELATED APPLICATION

The present application is a continuation of U.S. patent application Ser. No. 10/968,933, filed Oct. 21, 2004, which issued as U.S. Pat. No. 7,531,012 on May 12, 2009, the entirety of which is incorporated herein by reference.

FIELD OF INVENTION

The present invention relates generally to lithium polymer batteries and more specifically to the design and method of manufacturing of the electrochemical cells making up a lithium polymer battery.

BACKGROUND OF THE INVENTION

Rechargeable batteries manufactured from laminates of solid polymer electrolytes and sheet-like anodes and cathodes display many advantages over conventional liquid electrolyte batteries. These advantages include having a lower overall battery weight, a high power density, a high specific energy and a longer service life, as well as being environmentally friendly since the danger of spilling toxic liquid into the environment is eliminated.

The components of a solid polymer electrochemical cell include positive electrodes, negative electrodes and separators capable of permitting ionic conductivity, such as solid polymer electrolytes, sandwiched between each anode and cathode. The anodes (or negative electrodes) and cathodes (or positive electrodes) are made of material capable of reversible insertion of alkali metal ions. The polymer electrolyte separators electrically isolate the anode from the cathode to prevent short circuits therebetween, which would render the electrochemical cell useless.

The cathodes are typically formed of a mixture of active material capable of occluding and releasing lithium, such as transitional metal oxides or phosphates, an electronically conductive filler, usually carbon or graphite or combinations thereof, and an ionically conductive polymer binder. Cathode materials are usually paste-like and require a current collector, usually a thin sheet of electrically conductive material such as aluminum foil. The anodes are typically made of light-weight metal foils, such as alkali metals and alloys, typically lithium metal, lithium oxide, lithium-aluminum alloys and the like. The anodes may also be composite paste-like material comprising, for example, carbon-based intercalation compounds in a polymer binder, in which case the anode also requires a current collector support, preferably a thin sheet of copper.

Composite cathode thin films are usually obtained by solvent coating onto a current collector or by melt extrusion. Similarly, the polymer electrolyte separator layer is typically produced by solvent coating or by melt extrusion.

Solid lithium polymer electrochemical cells are typically manufactured by successive layering of the positive electrode, the electrolyte separator and the negative electrode. The positive electrode material is initially coated or extruded onto a metallic foil (for example aluminum) or onto a metallized plastic film, which serves as a current collector. The polymer electrolyte separator is thereafter preferably coated or extruded directly onto the previously coated cathode material and the negative electrode is finally laminated onto the electrolyte to form an electrochemical cell. To increase the energy density of an electrochemical cell, a bi-face design is preferred wherein positive electrode material is laminated, coated or extruded onto both sides of the current collector.

Electrochemical cells as previously described are assembled in an offset pattern: the metallic anode or negative current collector extends from one side of the electrochemical cell, while the cathode current collector extends from the other side of the electrochemical cell. The electrolyte separator (or separators in the case of bi-face designs) is positioned in between the anode and the cathode but does not extend the entire width of the electrochemical cell because a portion of the metallic anode or negative current collector on one side and a portion of the cathode current collector on the other side must remain exposed for lateral collection of current (i.e. to allow for connection in parallel to other electrochemical cells and to the positive and negative terminals of the electrochemical generator of which it is a constituent of). The exposed anodes and cathodes may in some circumstances touch each other when the electrochemical cells are assembled and pressed together, resulting in a short circuit which renders the cells useless. Short circuits may also occur through misplacement or misalignment of the various layers of the electrochemical cells or through misplacement or misalignment of a stack of electrochemical cells.

To alleviate this potential problem, U.S. Pat. No. 5,360,684 disclosed the addition of an insulating band of polypropylene or other plastic material between the exposed ends of the anode and the cathode current collector, for the sole purpose of eliminating potential short circuit. U.S. patent application Ser. No. 09/876,567 (publication No. US2002/0197535A1) discloses a variant of the same concept, in which an insulating edge material is coated or extruded at the end of the cathode material to prevent a potential short circuit between the exposed ends of the anode and the cathode layer. U.S. Pat. No. 5,670,273 discloses a method of fabricating electrochemical cells, wherein the successive anode and cathode layers are separated by a polymeric electrolyte layer having a protruding polymer edge that reduces the likelihood of inadvertent contact between the anode and cathode current collectors.

The above described solutions all fulfill their purpose, however at the cost of either adding steps to the manufacturing process of the electrochemical cells or having protruding separators that hinder proper parallel connections of the current collectors and may cause potential weight penalties.

Thus, there is a need for an electrochemical cell configuration that prevents inadvertent short circuits between the anode and cathode, as well as for a reliable method and apparatus for the production of electrochemical cell sub-assemblies for lithium polymer batteries.

STATEMENT OF THE INVENTION

It is therefore an object of the present invention to provide an electrochemical cell configuration that prevents inadvertent short circuits between the anode and cathode.

It is another object of the present invention to provide a method of manufacturing sub-assembly components for a thin film electrochemical cell.

It is a further object of the present invention to provide an electrochemical generator comprising a plurality of electrochemical cells configured to prevent inadvertent short circuits between the anodes and cathodes.

As embodied and broadly described, the present invention provides a method for manufacturing an electrochemical cell sub-assembly for a lithium polymer battery, the method including:

(a) providing a current collector sheet having a pair of opposite surfaces and a pair of opposite edges, where each surface is coated with a respective layer of electrode material;

(b) extruding a layer of polymer electrolyte over the current collector sheet such that the layer of polymer electrolyte envelopes both layers of electrode material and one of the pair of edges of the current collector sheet, thereby encapsulating the one edge of the current collector sheet while leaving exposed the other edge of the current collector sheet.

As embodied and broadly described, the present invention also provides an electrochemical cell including:

(a) a positive electrode including:
 a current collector sheet having a pair of opposite surfaces and a pair of opposite edges;
 a layer of positive electrode material disposed on each surface of the current collector sheet;

(b) a polymer electrolyte separator encapsulating both layers of positive electrode material and one of the pair of edges of the current collector sheet, thereby leaving the other edge of the current collector sheet exposed; and (c) at least one negative electrode disposed over said polymer electrolyte separator.

As embodied and broadly described, the present invention further provides an electrochemical cell sub-assembly including:

(a) a current collector sheet having a pair of opposite surfaces and a pair of opposite edges, each surface being coated with a respective layer of electrode material;

(b) a layer of polymer electrolyte enveloping both layers of electrode material and one of the pair of edges of the current collector sheet, thereby encapsulating the one edge of the current collector sheet while leaving exposed the other edge of the current collector sheet.

As embodied and broadly described, the present invention also provides a system for manufacturing an electrochemical cell sub-assembly, the system including:

(a) a conveyor mechanism transporting a current collector sheet having a pair of opposite surfaces and a pair of opposite edges, each surface of the current collector sheet being coated with a respective layer of electrode material;

(b) an extrusion die having a pair of distinct discharge nozzles and a passageway disposed generally in between the distinct discharge nozzles, the passageway operative to receive the current collector sheet from the conveyor mechanism, each discharge nozzle operative to discharge a film of polymer electrolyte onto a respective surface of the current collector sheet when the current collector sheet travels through the passageway, thereby encapsulating both layers of electrode material and one of the pair of edges of the current collector sheet, while leaving exposed the other edge of the current collector sheet.

As embodied and broadly described, the present invention also provides a method for manufacturing an electrochemical cell sub-assembly for a lithium polymer battery, said method comprising:

(a) providing a current collector sheet having a pair of opposite surfaces and a pair of opposite edges, where each surface is coated with a respective layer of electrode material;

(b) laminating a layer of polymer electrolyte over each surface of the current collector sheet such that the layers of polymer electrolyte envelope both layers of electrode material and one of the pair of edges of the current collector sheet, thereby encapsulating the one edge of the current collector sheet while leaving exposed the other edge of the current collector sheet.

As embodied and broadly described, the present invention also provides a system for manufacturing an electrochemical cell sub-assembly for a lithium polymer battery, said system comprising:

(a) a conveyor mechanism transporting a current collector sheet having a pair of opposite surfaces and a pair of opposite edges, each surface of said current collector sheet being coated with a respective layer of electrode material;

(b) a lamination apparatus having a pair of pressure rollers, said pressure rollers defining a passageway therebetween for receiving said current collector sheet from said conveyor mechanism, each pressure roller operative to laminate a polymer electrolyte layer onto a respective surface of said current collector sheet when said current collector sheet travels through said passageway, thereby encapsulating both said layers of electrode material and one of the pair of edges of said current collector sheet, while leaving exposed the other edge of said current collector sheet.

BRIEF DESCRIPTION OF THE DRAWINGS

The invention will be better understood and other advantages will appear by means of the following description and the following drawings in which.

DETAILED DESCRIPTION

Figure 1:
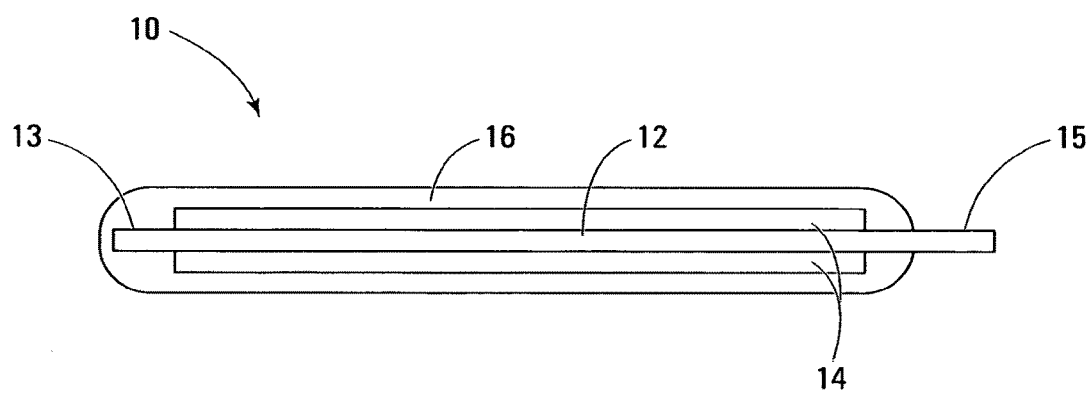
FIG. 1 is a schematic cross-sectional view of a electrochemical cell sub-assembly, in accordance with an embodiment of the present invention.

With reference to FIG. 1, there is shown a cross-section of an electrochemical cell sub-assembly 10, in accordance with an embodiment of the present invention. The electrochemical cell sub-assembly 10 includes a central current collector element 12, a layer of electrode material 14 coated on each surface of the central current collector element 12 and a polymer electrolyte 16. The polymer electrolyte 16 completely envelopes the layers of electrode material 14 coated on the surfaces of the central current collector element 12, as well as one edge 13 of the current collector element 12. In this example, the layer of electrode material 14 consists of a cathode or positive electrode material. The polymer electrolyte envelope 16 is ionically conductive but electrically non-conductive, as is well known in the art, in order to allow ionic exchanges between the positive and negative electrodes but inhibit the formation of electrical current pathway between the positive and negative electrodes of the electrochemical cell. As shown in FIG. 1, the electrode layers 14 and one edge 13 of the central current collector 12 are completely enclosed within the polymer electrolyte envelope 16 and therefore are completely isolated electrically. Only edge 15 of the central current collector 12 remains exposed for the purpose of electrical connection to other electrochemical cells or to the electrical post of the generator having at least one electrochemical cell.

Figure 2:
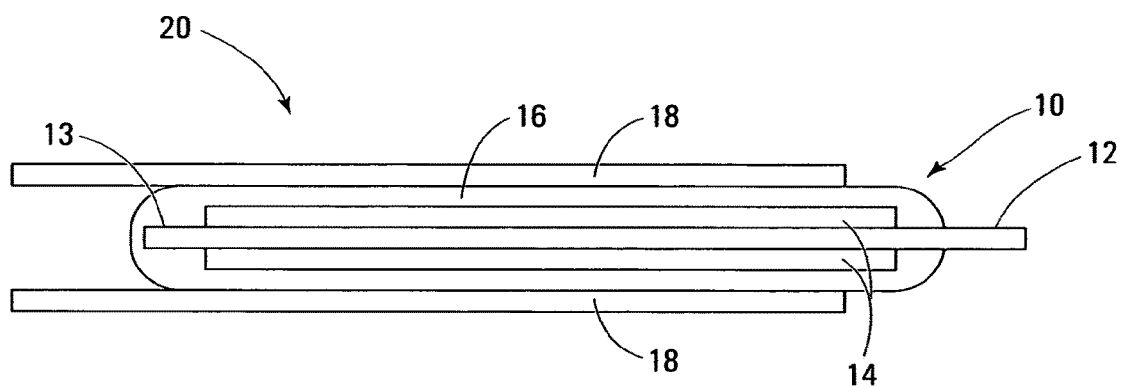
FIG. 2 is a schematic cross-sectional view of an electrochemical cell, in accordance with an embodiment of the present invention.

FIG. 2 illustrates a complete electrochemical cell 20, in accordance with an embodiment of the present invention. The electrochemical cell 20 is formed of the sub-assembly 10, which includes the central current collector element 12, the layers of electrode material 14 coated on each surface of the central current collector element 12 and the polymer electrolyte envelope 16, which completely envelopes the layers of electrode material 14. A negative electrode 18 is disposed on each side of the polymer electrolyte envelope 16 facing the layers of positive electrode material 14, thereby sandwiching the polymer electrolyte envelope 16 and completing the electrochemical cell 20. As illustrated, the layers of positive electrode material 14 and edge 13 of the central current collector element 12 are completely isolated electrically from the negative electrodes 18, thereby reducing the risks of short circuits between the negative electrodes 18 and either the positive electrode material 14 or the edge 13 of the central current collector element 12. In this particular configuration, the positive and negative electrical contact points are offset. More specifically, the current collector element 12 of the positive electrode extends to one side of the electrochemical cell 20, while the negative electrodes 18 extend to the other side of the electrochemical cell 20, such that the electrical contact points are on opposite sides of the electrochemical cell 20. As is well known in the art, a plurality of electrochemical cells may be stacked together, their positive electrodes connected together in parallel and their negative electrodes also connected in parallel, to increase their overall capacity (Amp/hr).

The electrochemical cells described herein are typically formed of extremely thin constituents. For example:

the thickness of the central current collector element 12 may range from 12 µm to 50 µm;

the thickness of one layer of positive electrode material 14 may range from 15 µm to 100 µm;

the thickness of one side of the polymer electrolyte envelope 16 may range from 15 µm to 50 µm; and the thickness of the negative electrode 18 may range from 20 µm to 80 µm.

The above thickness ranges are given only as an example, in order to illustrate the difficulty of producing such an assembly. Other thickness ranges for each of the central current collector element 12, the positive electrode material 14, the polymer electrolyte envelope 16 and the negative electrode 18 are also possible and included within the scope of the present invention.

Figure 3:
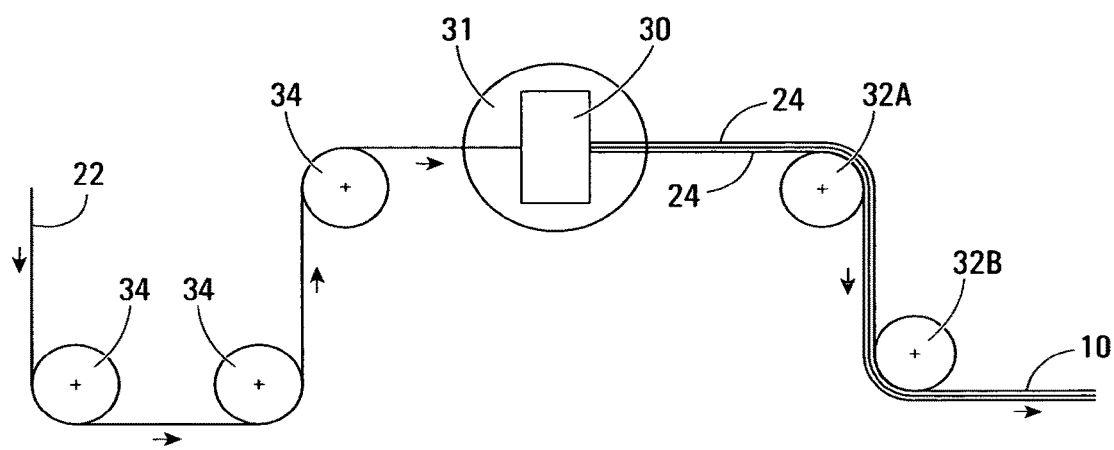
FIG. 3 is a schematic side elevational view of an extrusion process for encapsulating the electrode layers previously deposited on a current collector with a polymer electrolyte, in accordance with an example of implementation of the present invention.
Figure 4:
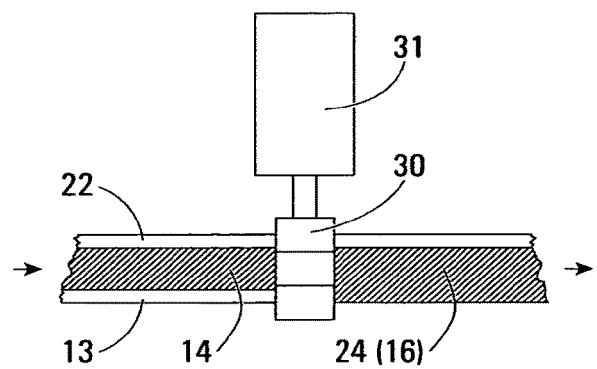
FIG. 4 is a schematic top plan view of the extrusion process illustrated in FIG. 3, showing a current collector and electrode assembly traveling through the extrusion die.

FIGS. 3 and 4 illustrate an example implementation of an apparatus and method for overlaying a central current collector element having layers of electrode material on both its surfaces with a polymer electrolyte envelope, in order to form the electrochemical cell sub-assembly 10 illustrated in FIG. 1, in accordance with an embodiment of the present invention. A pre-assembly 22, including a current collector element 12 that was previously coated on both its surfaces with layers of electrode material 14, is delivered via a conveyor mechanism, in this example a series of cylindrical rollers 34, to a dual extrusion die 30, where thin layers of polymer electrolyte 24 are overlaid onto each side of the pre-assembly 22. A single screw or twin screw extruder 31 feeds polymer electrolyte material to the dual extrusion die 30.

As illustrated in FIGS. 3 and 4, the pre-assembly 22 travels through dual extrusion die 30, where a thin layer of polymer electrolyte 24 is applied simultaneously to both sides of the pre-assembly 22. As seen more clearly in FIG. 4, the layers of polymer electrolyte 24 are wider than the layers of electrode material 14, such that the two layers of polymer electrolyte 24 completely encapsulate the layers of electrode material 14 and also circumvent one edge 13 of the current collector 12. The pre-assembly 22 with its polymer electrolyte envelope 16 is then redirected by a series of cylindrical rollers 32A and 32B, which are preferably maintained at a cool temperature in order to accelerate the solidification of the polymer electrolyte envelope 16 and to prevent unwanted adhesion of the polymer to the rollers. The complete electrochemical cell sub-assembly 10 (FIG. 1) is then routed towards other stations for further processing or storage.

Figure 5:
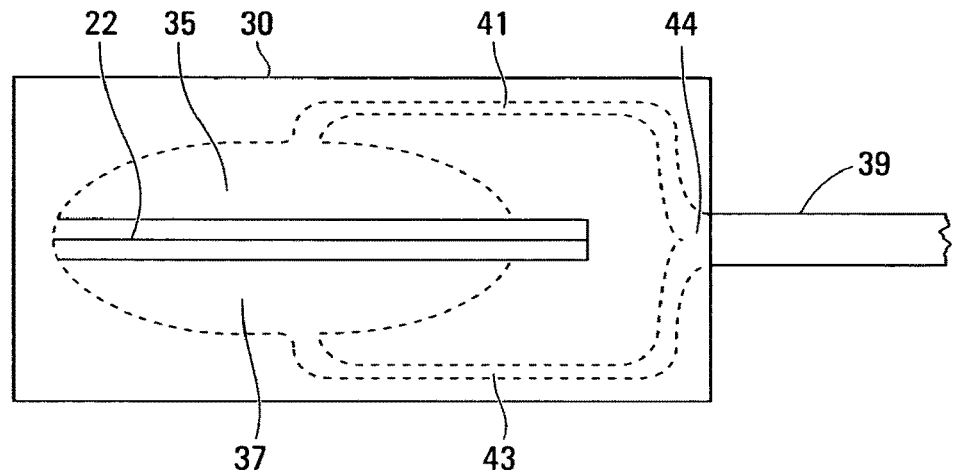
FIG. 5 is a schematic cross-sectional view of the extrusion die of FIG. 3 applying an electrolyte layer on both sides of a current collector and electrode assembly.

FIG. 5 illustrates schematically a cross-sectional view of the dual extrusion die 30 of FIGS. 3 and 4, when the pre-assembly 22 travels directly therethrough. Extrusion die 30 includes two discharge nozzles 35 and 37, illustrated in dotted lines, which determine the path that the polymer electrolyte follows inside the extrusion die 30 before being discharged as a thin sheet onto both sides of the pre-assembly 22. The polymer electrolyte material is fed to the extrusion die 30 under pressure from the extruder 31 (FIGS. 3 and 4) through a cylindrical channel 39. Upon entering the extrusion die 30, the polymer electrolyte material is divided by a flow divider 44 into two separate internal channels 41 and 43, leading to the discharge nozzles 35 and 37, respectively. When entering the discharge nozzles 35 and 37, the polymer electrolyte material is shaped into a wide but thin film. This film is discharged over an area that covers the layers of electrode material 14, the entire edge 13 of the current collector element 12 and a portion of the other end 15 of the current collector element 12. Accordingly, the two layers of electrode material 14 are enveloped and electrically isolated.

Figure 6:
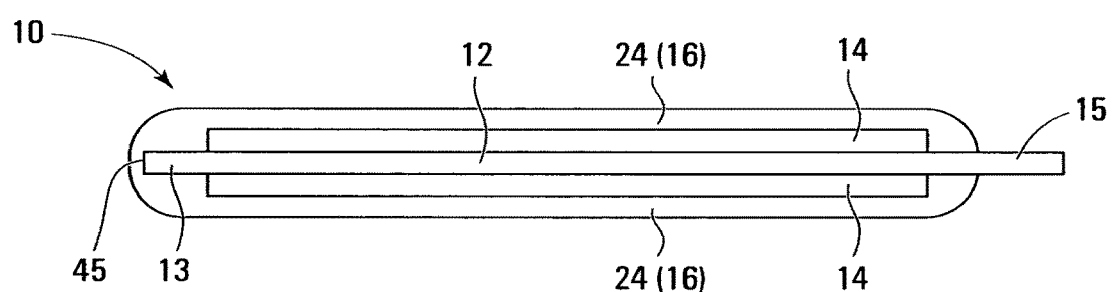
FIG. 6 is a schematic cross-sectional view of an electrochemical cell sub-assembly resulting from the process illustrated in FIG. 3.

FIG. 6 illustrates schematically a cross sectional view of the electrochemical cell sub-assembly 10 exiting the dual extrusion die 30, where it can be seen that the two layers of polymer electrolyte 24 merge together at a meeting point 45 beyond the end of the edge 13 of current collector 12, thereby forming the polymer electrolyte envelope 16.

Figure 7:
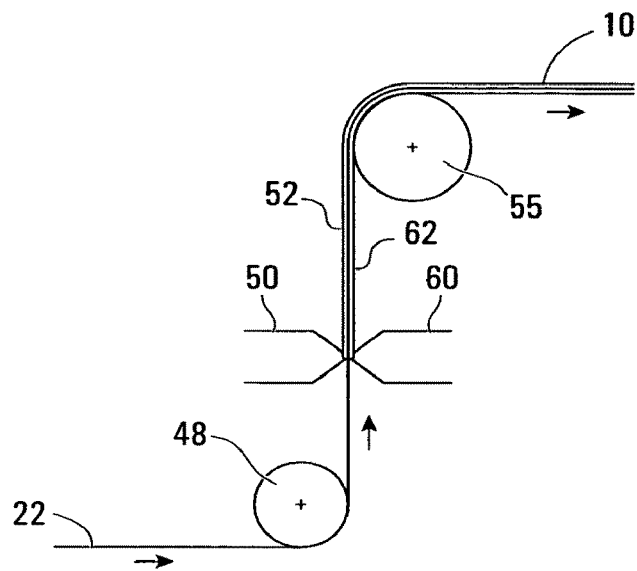
FIG. 7 is a schematic cross-sectional view of an extrusion process for encapsulating the electrode layers previously deposited on a current collector, in accordance with another example of implementation of the present invention.

FIG. 7 illustrates another example of implementation of an apparatus and method for overlaying a central current collector element having layers of electrode material on both its surfaces with a polymer electrolyte envelope, in order to form the electrochemical cell sub-assembly 10 illustrated in FIG. 1. A pre-assembly 22 formed of a current collector element 12 that was previously coated on both its surfaces with layers of electrode material 14 is delivered via a series of cylindrical rollers 48 (only one shown) to a pair of extrusion dies 50 and 60, where thin layers of polymer electrolyte 52 and 62 are overlaid simultaneously onto respective sides of the pre-assembly 22. Since both layers 52 and 62 of polymer electrolyte are wider than the layers of electrode material 14, they completely encapsulate the layers of electrode material 14. The pre-assembly 22 with its layers 52 and 62 of polymer electrolyte is next guided by cylindrical roller 55, which is preferably maintained at a cool temperature in order to accelerate the solidification of the polymer electrolyte layers and prevent any unwanted adhesion thereof. The complete electrochemical cell sub-assembly 10 is routed towards other stations for further processing or storage.

Figure 8:
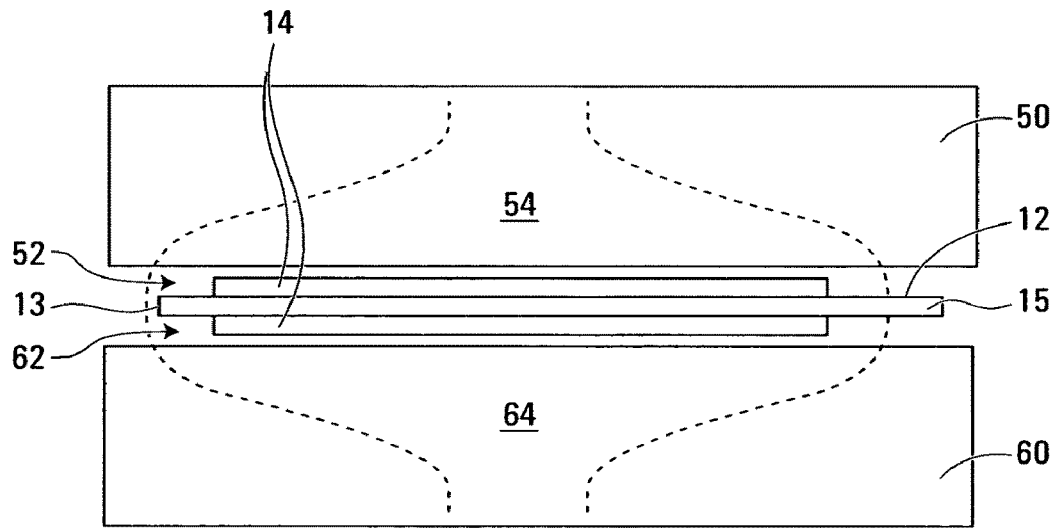
FIG. 8 is a schematic top cross sectional view of the opposing extrusion dies of FIG. 7 applying an electrolyte layer on a both sides of a current collector and electrode assembly.

FIG. 8 illustrates schematically a top cross sectional view of the pair of opposing extrusion dies 50 and 60 of FIG. 7, when the pre-assembly 22 including its layers of electrode material 14 travels directly in front of the discharge ends of extrusion dies 50 and 60. The internal channels 54 and 64 of extrusion dies 50 and 60, respectively, are illustrated in dotted lines and determine the path that the polymer electrolyte follows inside each extrusion die 50 and 60 before being discharged as thin sheets onto the surfaces of the pre-assembly 22. The polymer electrolyte sheets 52 and 62 are spread over an area covering the layers of electrode material 14 and extending marginally beyond edge 13 of the current collector element 12, in order to envelop and electrically isolate the end of edge 13. The polymer electrolyte sheets 52 and 62 also extend over a portion of the other end 15 of the current collector element 12, thereby enveloping and electrically isolating the two layers of electrode material 14.

Figure 9:
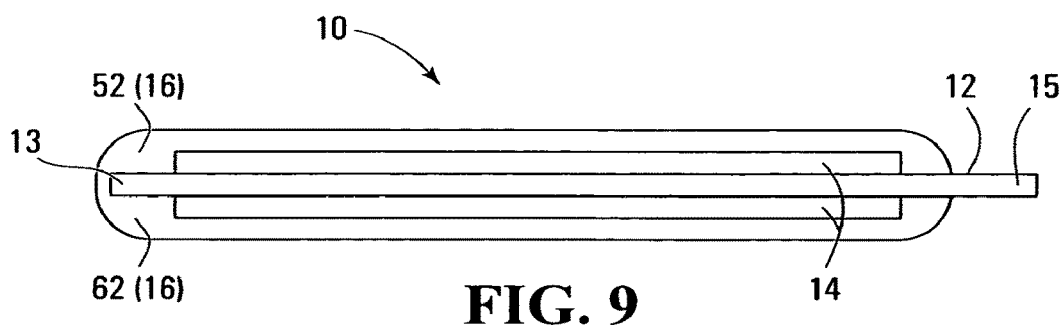
FIG. 9 is a schematic cross-sectional view of an electrochemical cell sub-assembly resulting from the process illustrated in FIG. 7.

FIG. 9 illustrates the electrochemical cell sub-assembly 10 resulting from the apparatus and method of extrusion shown in and described with regard to FIGS. 7 and 8. As previously mentioned, the polymer electrolyte sheets 52 and 62 are discharged over an area that extends marginally beyond edge 13 of the current collector element 12, such that the polymer electrolyte sheets 52 and 62 merge beyond the edge 13 thereby enclosing the edge 13 and forming the polymer electrolyte envelope 16.

Although FIG. 7 illustrates extrusion dies 50 and 60 directly opposed to each other, they may be offset relative to one another.

Figure 10:
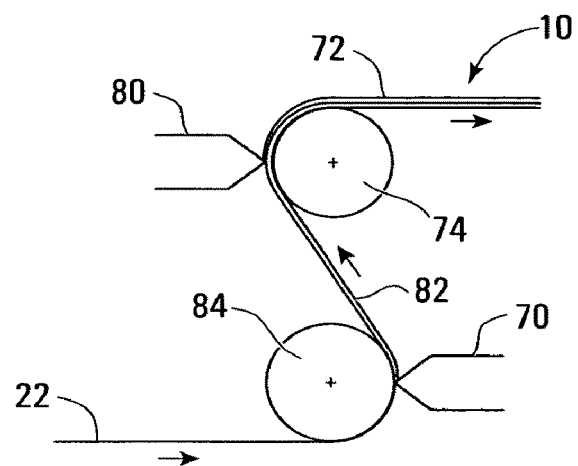
FIG. 10 is a schematic side elevational view of an extrusion process for encapsulating the electrode layers previously deposited on a current collector, in accordance with yet another example of implementation of the present invention.

FIG. 10 illustrates a variant example of implementation of the apparatus and method for overlaying a central current collector element having layers of electrode material on both its surfaces with a polymer electrolyte envelope, in order to form the electrochemical cell sub-assembly 10 illustrated in FIG. 1. In this example, the extrusion dies 70 and 80 are offset relative to each other. The pre-assembly sheet 22 is preferably supported by cylindrical rollers 74 and 84 when the layers of polymer electrolyte 72 and 82 are applied onto the traveling pre-assembly sheet 22. The polymer electrolyte layers or sheets 72 and 82 are discharged over an area that extends marginally beyond the edge 13 of the current collector element 12. Accordingly, the polymer electrolyte sheets 72 and 82 completely overlay the layers of electrode material 14 and merge beyond the edge 13, thereby enclosing the edge 13 and forming the polymer electrolyte envelope 16, as illustrated with more detail in FIG. 15.

Figure 11:
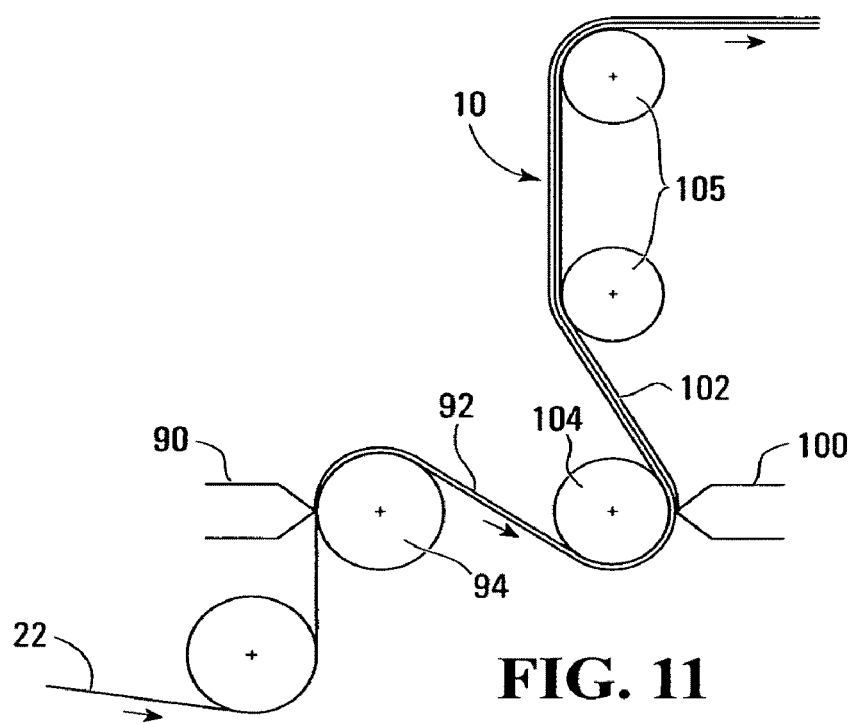
FIG. 11 is a schematic side elevational view of an extrusion process for encapsulating the electrode layers previously deposited on a current collector, in accordance with another example of implementation of the present invention.

FIG. 11 illustrates another variant example of implementation of the apparatus and method for overlaying a central current collector element having layers of electrode material on both its surfaces with a polymer electrolyte envelope, in order to form the electrochemical cell sub-assembly 10 illustrated in FIG. 1. In this example, the extrusion dies 90 and 100 are disposed in a marginally different configuration than that illustrated in FIG. 10, although the extrusion dies 90 and 100 are still offset relative to each other. The pre-assembly sheet 22 is supported by cylindrical rollers 94 and 104 when the layers of polymer electrolyte 92 and 102 are applied onto the traveling pre-assembly sheet 22. As previously described with reference to FIG. 8, the polymer electrolyte layers or sheets 92 and 102 are discharged over an area that extends marginally beyond the edge 13 of the current collector element 12. Accordingly, the polymer electrolyte sheets 92 and 102 completely overlay the layers of electrode material 14 and merge beyond the edge 13, thereby enclosing the edge 13 and forming the polymer electrolyte envelope 16, as illustrated with more detail in FIG. 15.

Figure 12:
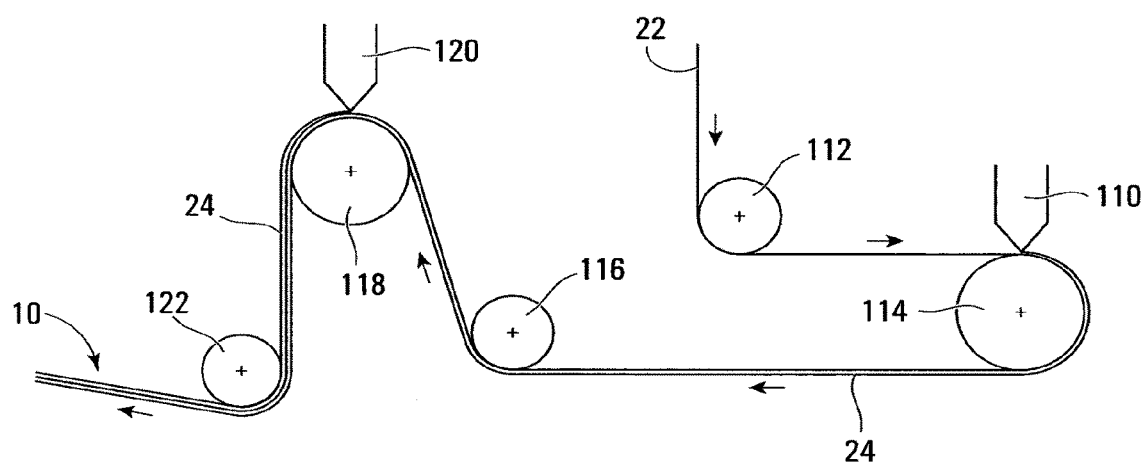
FIG. 12 is a schematic side elevational view of an extrusion process for encapsulating the electrode layers previously deposited on a current collector, in accordance with another example of implementation of the present invention.

FIG. 12 illustrates yet another variant example of implementation of the apparatus and method for overlaying a central current collector element having layers of electrode material on both its surfaces with a polymer electrolyte envelope, in order to form the electrochemical cell sub-assembly 10 illustrated in FIG. 1. In this example, the pre-assembly 22 is delivered via a series of cylindrical rollers 112 (only one shown) to a first extrusion die 110, where a thin layer of polymer electrolyte 24 is overlaid onto a first side of the pre-assembly 22.

As previously described, the layer of polymer electrolyte 24 is wider than the layer of electrode material, such that it completely encapsulates the layer of electrode material. The pre-assembly 22 with the added layer of polymer electrolyte 24 on one of its surfaces is then redirected by a cylindrical roller 114, which is preferably maintained at a cool temperature in order to accelerate the solidification of the polymer electrolyte layer 24. The pre-assembly 22 with the added layer of polymer electrolyte 24 is then delivered via another series of cylindrical rollers 116 (only one shown) to a second extrusion die 120, where another thin layer of polymer electrolyte 24 is overlaid onto the second side of the pre-assembly 22. Again, the layer of polymer electrolyte 24 being applied on the second side of the pre-assembly 22 is wider than the layer of electrode material, such that it completely encapsulates the layer of electrode material. The pre-assembly 22 with both layers of polymer electrolyte 24 forming an envelope 16 is supported by cylindrical roller 118, which is also preferably maintained at a cool temperature in order to accelerate the solidification of the second polymer electrolyte layer 24 and to prevent unwanted adhesion of the first layer of polymer electrolyte 24. The complete electrochemical cell sub-assembly 10 is routed towards other stations via another series of cylindrical rollers 122 (only one shown) for further processing or storage.

Figure 13:
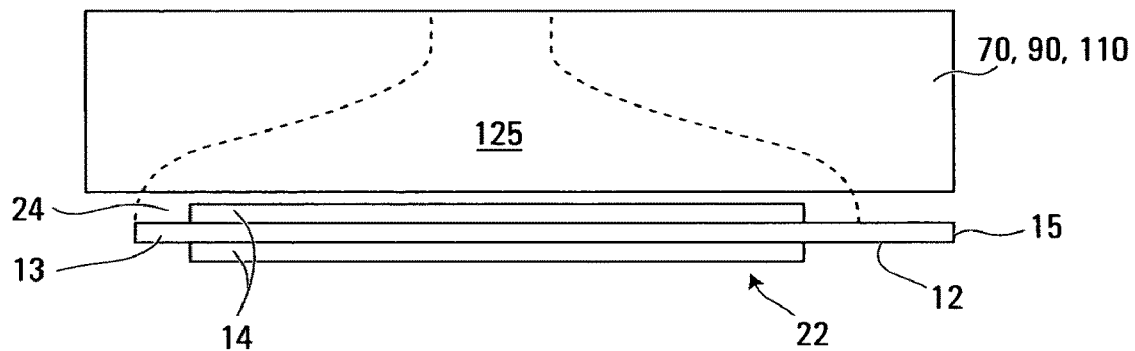
FIG. 13 is a schematic cross sectional view of the first extrusion dies of FIGS. 10, 11 and 12 depositing a first layer of polymer electrolyte onto a first side of a current collector and electrode assembly.

FIG. 13 illustrates schematically a cross sectional view of each of the first extrusion dies 70, 90 and 110 of FIGS. 10, 11 and 12, respectively, when the pre-assembly 22 travels directly in front of the discharge end of the extrusion die. The internal channel 125 of the extrusion die 70, 90, 110 is illustrated in dotted lines and determines the path that the polymer electrolyte follows inside the extrusion die 70, 90, 110 before being discharged as a thin film onto a first side of the pre-assembly 22. The polymer electrolyte sheet 24 is spread over an area that covers the first layer of electrode material 14, the entire edge 13 of the current collector element 12 and a portion of the other edge 15 of the current collector element 12, thereby enveloping and electrically isolating the first layer of electrode material 14.

Figure 14:
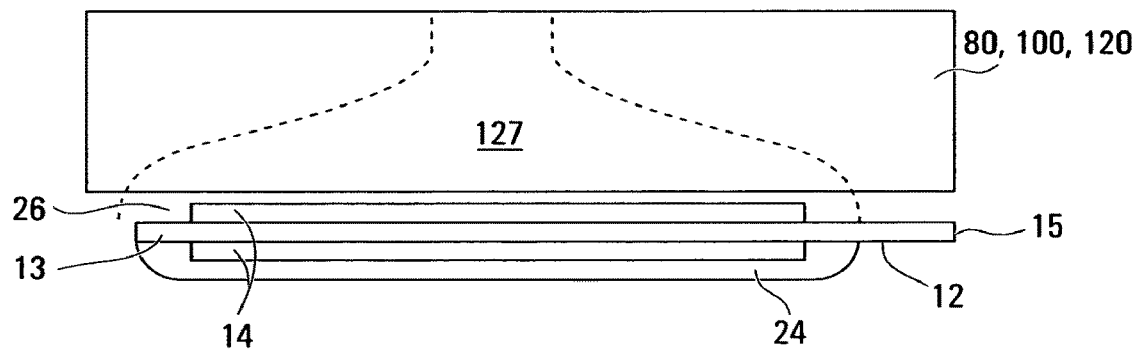
FIG. 14 is a schematic cross sectional view of the second extrusion dies of FIGS. 10, 11 and 12 depositing a second layer of polymer electrolyte onto a second side of a current collector and electrode assembly.

FIG. 14 illustrates schematically a cross sectional view of each of the second extrusion dies 80, 100 and 120 of FIGS. 10, 11 and 12, respectively, when the pre-assembly 22 including the first added polymer electrolyte layer 24 travels directly in front of the discharge end of the extrusion die with the second side or surface of the pre-assembly 22 facing the extrusion die. The internal channel 127 of the extrusion die 80, 100, 120 is illustrated in dotted lines and determines the path that the polymer electrolyte follows inside the extrusion die 80, 100, 120 before being discharged as a thin film onto the second side or surface of the pre-assembly 22. The polymer electrolyte sheet 26 is spread over an area that covers the second layer of electrode material 14 and extends marginally beyond edge 13 of the current collector element 12, in order to envelop and electrically isolate the end of edge 13. The polymer electrolyte sheet 26 also extends over a portion of the other end 15 of the current collector element 12, thereby enveloping and electrically isolating the second layer of electrode material 14.

Figure 15:
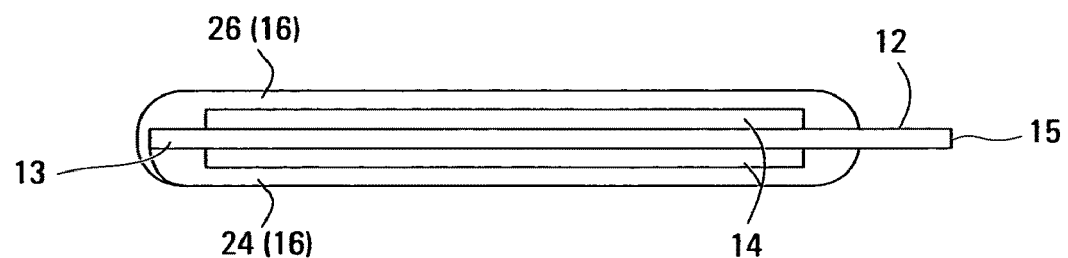
FIG. 15 is a schematic cross-sectional view of an electrochemical cell sub-assembly resulting from the process illustrated in each of FIGS. 10, 11 and 12.

FIG. 15 illustrates the electrochemical cell sub-assembly 10 resulting from the apparatuses and methods of extrusion shown in and described with regard to FIGS. 10 to 14. As previously described, the polymer electrolyte sheet 26 is discharged over an area that extends marginally beyond edge 13 of the current collector element 12. As such, it folds over the edge 13 by capillarity to enclose the edge 13 and adhere to previously applied polymer electrolyte layer 24, for forming the polymer electrolyte envelope 16.

Figure 16:
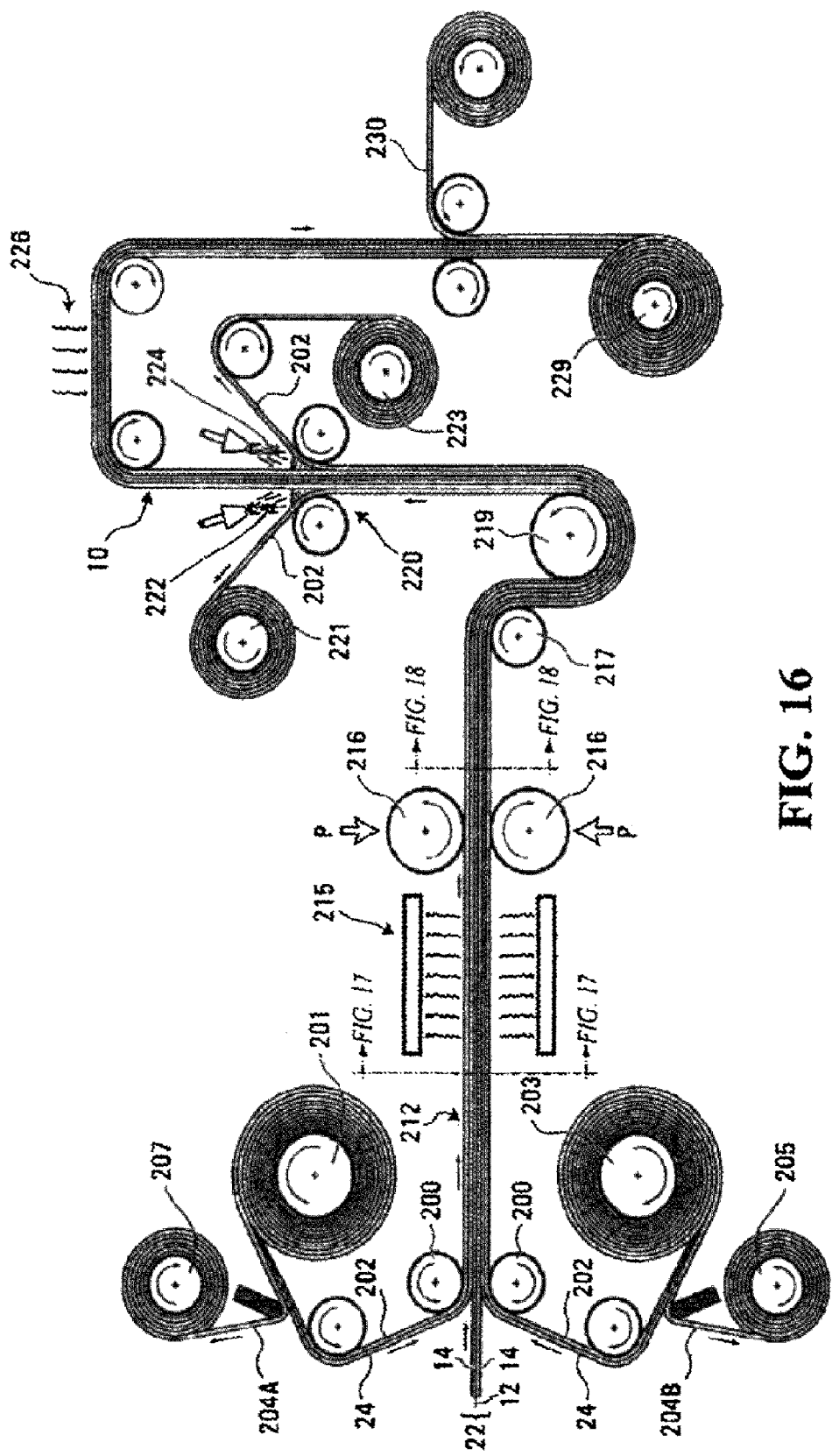
FIG. 16 is a schematic side elevational view of a lamination process for encapsulating the electrode layers previously deposited on a current collector, in accordance with yet another example of implementation of the present invention.

FIG. 16 illustrates another variant example of implementation of the apparatus and method for overlaying a central current collector element having layers of electrode material on both its surfaces with a polymer electrolyte envelope, in order to form the electrochemical cell sub-assembly 10 illustrated in FIG. 1. In this example, the polymer electrolyte envelope 16 is formed by laminating polymer electrolyte films 24 onto the electrode layers 14 of each surface of the central current collector 12. As illustrated in FIG. 16, a pre-assembly 22, including a current collector element 12 that was previously coated on both its surfaces with layers of electrode material 14, is delivered via any conveyor system to a first pair of rollers 200, where thin films of polymer electrolyte 24 are overlaid onto each side of the pre-assembly 22. Alternatively, the polymer electrolyte films 24 may be overlaid onto the respective sides of the pre-assembly 22 at different locations and in successive steps, as opposed to the simultaneous application illustrated in FIG. 16.

Figure 17:
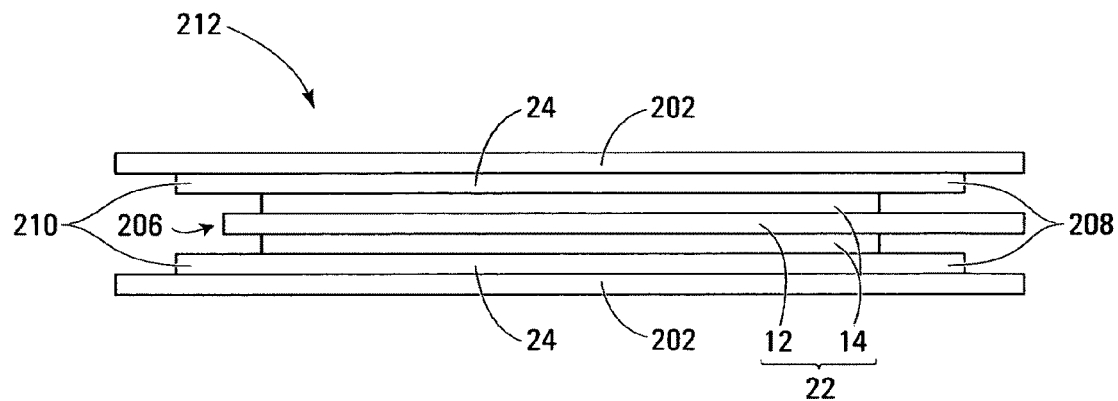
FIG. 17 is a schematic cross-sectional view taken at line 17-17 of FIG. 16.

In a specific example, each thin film of polymer electrolyte 24 has been previously laid onto a plastic support film 202, covered by another protective plastic film 204 and wound into a roll 201, 203 for storage. As illustrated in FIG. 16, the protective plastic films 204A and 204B are peeled off of the thin films of polymer electrolyte 24, routed away from the rollers 200 and wound onto recuperation rolls 205 and 207, in order to expose the polymer electrolyte films 24 to the layers of electrode material 14 prior to lamination. The polymer electrolyte films 24 are then brought into contact with the layers of electrode material 14 such that they are offset to one side of the pre-assembly 22, as seen in FIG. 17. More specifically, both polymer electrolyte films 24 extend over one edge 206 of the pre-assembly 22, and thus over one edge of the central current collector 12 of the pre-assembly 22, such that the extensions 210 of the polymer electrolyte layers 24 may be brought into contact with each other when the entire assembly is pressed together. The ends 208 of the polymer electrolyte films 24 also extend past the ends of the layers of electrode material 14, in order to encapsulate them when the entire assembly is pressed together.

The laminate 212 formed of a central current collector 12, two layers of electrode material 14, as well as a layer of polymer electrolyte 24 and a plastic support film 202 on each side thereof, next enters a heating zone 215. In this heating zone 215, the two layers of polymer electrolyte 24 are heated to a temperature sufficient to promote adhesion of the polymer electrolyte layers 24 onto the electrode layers 14, as well as adhesion of the extensions 210 of the polymer electrolyte layers 24 to each other. The heat may be generated by any means known to those skilled in the art.

Figure 18:
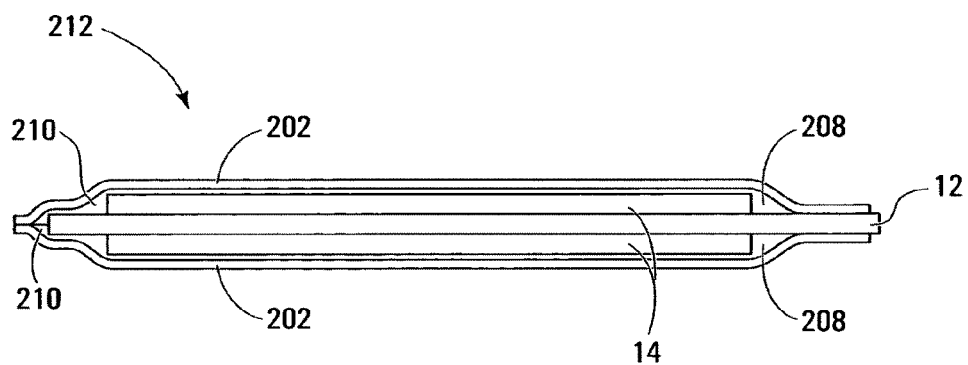
FIG. 18 is a schematic cross-sectional view taken at line 18-18 of FIG. 16.

The heated laminate 212 then passes through a pair of lamination rollers 216, at least one of which is covered with a layer of rubber or other flexible material in order to conform to the profile of the laminate 212 and exert a pressure P onto the entire surface of the respective polymer electrolyte film 24. Accordingly, the extensions 210 of the polymer electrolyte layers 24 adhere to each other and envelop the edge of the central current collector 12, while the ends 208 of the polymer electrolyte layers 24 enclose the ends of the electrode material layers 14. As a result, the polymer electrolyte layers 24 encapsulate the entire electrode layers 14 and one edge of the central current collector 12, as illustrated in FIG. 18.

Thereafter, the laminate 212 is routed through a series of cooling rollers 217 and 219. The cooling rollers 217 and 219 are maintained at a temperature below room temperature (10° to 15° C.). The laminate 212 is maintained in contact with the cooling rollers 217, 219 as it travels over an arc of the circumference of each roller 217, 219, this being sufficiently long for the laminate 212 to dissipate its residual heat via the cooling rollers 217, 219.

The laminate 212 is then routed to a peeling station 220, where the plastic support films 202 are removed from the laminate 212 and wound onto recuperation rolls 221 and 223. To prevent any damage to the polymer electrolyte films 24 encapsulating the electrode layers 14 while the plastic support films 202 are being removed, a suitable solvent is introduced at each peeling point 222 and 224. This solvent reduces the adhesion forces between the polymer electrolyte layers 24 and the plastic support films 202, thus preventing any ripping of portions or segments of the polymer electrolyte films 24. As illustrated in FIG. 16, the peeling angles are less than 90°. In this manner, each pair of plastic support film 202 and polymer electrolyte film 24, once separated, forms a small pool where the solvent can remain and act on the interface between the plastic support film 202 and polymer electrolyte film 24.

Note that a small quantity of solvent may remain on the surface of each polymer electrolyte film 24. As such, the laminate 10 is next passed through a drying station 226, where the excess or remaining solvent is evaporated.

In order to store the encapsulated laminate 10, a new protective film 230 having a weak adherence to the polymer electrolyte is applied thereto in order to prevent adhesion of adjacent layers of polymer electrolyte 24 when the laminate 10 is wound onto a roll 229, as well as to ease peeling when the laminate 10 is brought for final assembly with the anode portions of the electrochemical cell. Of course, the laminate 10 may alternatively be brought directly to a further processing station for assembly into a complete electrochemical cell.

Figure 19:
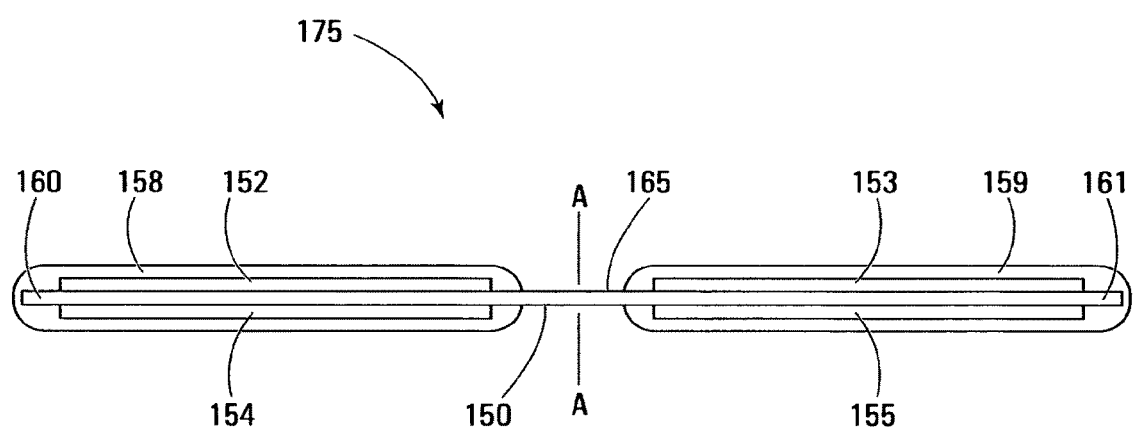
FIG. 19 is a schematic cross-sectional view of a dual electrochemical cell sub-assembly, in accordance with a variant embodiment of the present invention.

FIG. 19 illustrates a variant embodiment of the present invention, in which a large current collector element 150 is coated on each of its surfaces with two separate layers of electrode material. More specifically, layers 152 and 153 coat the first surface of the current collector element 150, while layers 154 and 155 coat the second surface of the current collector element 150. The layers of electrode material 152, 153 and 154, 155 are then encapsulated by two distinct polymer electrolyte envelopes 158 and 159, which also circumvent the edges 160 and 161, respectively, of the current collector element 150 to form a dual sub-assembly 175. As shown in FIG. 19, the electrode layers 152, 153 and 154, 155, as well as the two edges 160 and 161 of the current collector element 150, are completely enclosed and thus electrically isolated within the two polymer electrolyte envelopes 158 and 159. Only the intermediate portion 165 of the current collector element 150 remains exposed. In a subsequent step in the manufacturing process, the current collector element 150 is slit along the axis A-A at the midpoint of the intermediate portion 165, in order to form two separate electrochemical cell sub-assemblies 10 as illustrated in FIG. 1. The exposed edges of the previously slit current collector element 150 allows for electrical connection to other electrochemical cells or to the electrical post of the generator formed of a series of stacked electrochemical cells.

Any of the apparatuses previously described and shown in FIGS. 3, 7, 10, 11, 12 and 16 are suitable to produce the dual sub-assembly 175 shown in FIG. 19. However, the apparatuses which extrude polymer electrolyte layers will include extrusion dies having two separate internal channels, one for each polymer electrolyte layer, such that the layers of polymer electrolyte can be extruded to form the polymer electrolyte envelopes 158 and 159 shown in FIG. 19. Furthermore, the apparatuses which laminate the polymer electrolyte layers onto the pre-assembly 22 will be fed with two pairs of parallel polymer electrolyte films, in order to cover both electrode layers and both edges of the central current collector 150 prior to slitting. The slitting of the sub-assembly 175 may be done by any conventional method.

Figure 20:
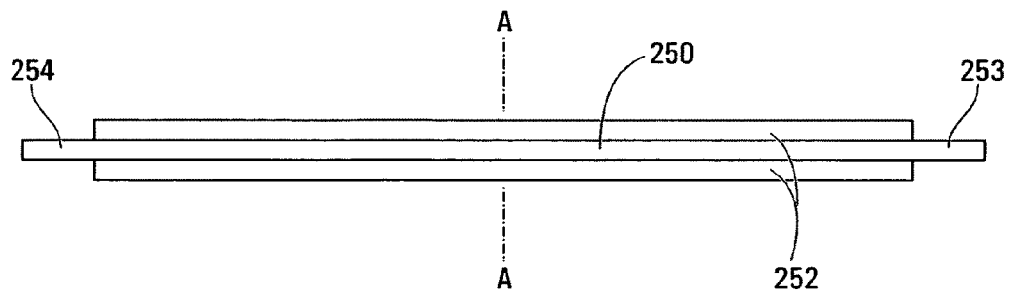
FIG. 20 is a schematic cross-sectional view of a pre-assembly of a large current collector previously coated with layers of electrode material, in accordance with another variant embodiment of the present invention.
Figure 21:
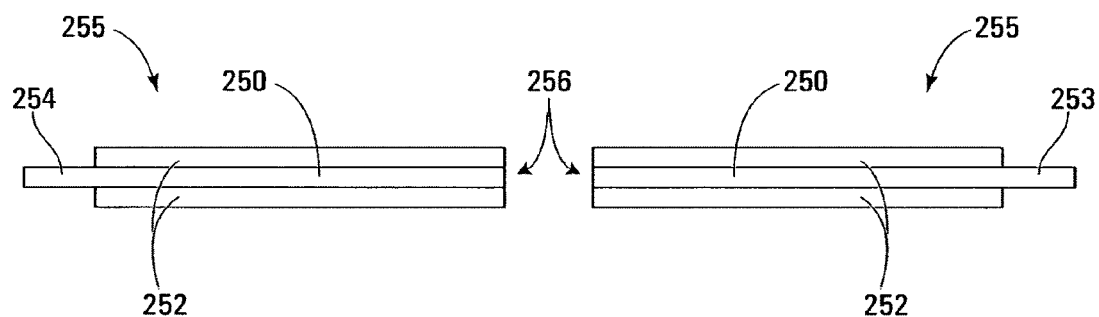
FIG. 21 is a schematic cross-sectional view of the pre-assembly illustrated in FIG. 20 after being cut.

In another variant embodiment of the present invention, FIG. 20 illustrates a large current collector element 250 coated with a large layer of electrode material 252 on each of its surfaces, leaving both edges 253 and 254 of the large current collector element 250 exposed. In a subsequent step of the manufacturing process, the pre-assembly formed of current collector element 250 and electrode layers 252 is slit or cut along the axis A-A at the midpoint, in order to form the two separate pre-assemblies 255 shown in FIG. 21. The ends of the current collector element 250 and of the electrode layers 252 on the cut sides 256 of the pre-assemblies 255 are therefore even, while the edges 253 and 254 remain exposed.

Figure 22:
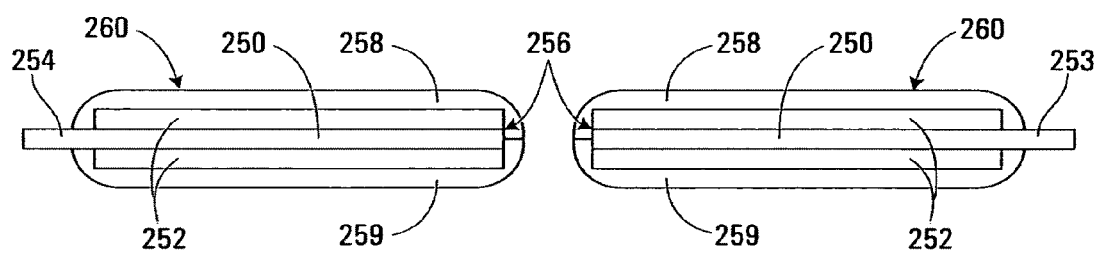
FIG. 22 is a schematic cross-sectional view of the pre-assemblies illustrated in FIG. 21, encapsulated with polymer electrolyte envelopes.

In a final step of the manufacturing process illustrated in FIG. 22, polymer electrolyte layers 258 and 259 are coated onto pre-assemblies 255 by any method previously described, such that the polymer electrolyte layers 258 and 259 encapsulate the entire electrode layers 252, as well as the ends 256, with a polymer electrolyte envelope 260. Thus, the ends 256 are electrically insulated to prevent any potential short circuit, while the edges 253 and 254 of the current collector element 250 remain exposed to allow for electrical connection to other electrochemical cells or to the electrical post of a generator formed of a series of stacked electrochemical cells.

Although the present invention has been described in relation to particular variations thereof, other variation and modifications are contemplated and are within the scope of the present invention. Therefore the present invention is not to be limited by the above description but is defined by the appended claims.

What is claimed is:

1. An electrochemical cell comprising:
   a. a positive electrode including:
      i. a current collector sheet having a pair of opposite surfaces and a pair of opposite edges;
      ii. a layer of positive electrode material disposed on each surface of the current collector sheet; one of the opposite edges of the current collector sheet extending to one side of the two layers of positive electrode material;
   b. an ionically conductive polymer electrolyte completely enveloping both layers of positive electrode material and the other edge of the current collector sheet, thereby encapsulating the other edge of the current collector sheet and leaving exposed the one edge of the current collector sheet extending to one side of the two layers of positive electrode material; and
   c. at least one negative electrode disposed over said polymer electrolyte and having one edge extending in the opposite direction of the exposed edge of the current collector sheet.

2. An electrochemical cell as defined in claim 1, wherein said at least one negative electrode extends outwardly from the encapsulated edge of said current collector sheet, such that said negative electrode is spaced apart from said exposed edge of said current collector sheet.

3. An electrochemical cell as defined in claim 1, comprising a pair of negative electrodes, each negative electrode being disposed adjacent a respective surface of said current collector sheet, over said polymer electrolyte, thereby forming a bi-face electrochemical cell.

4. An electrochemical cell as defined in claim 3, wherein each of said negative electrodes extends outwardly from the encapsulated edge of said current collector sheet, such that each of said negative electrodes is spaced apart from said exposed edge of said current collector sheet.

5. An electrochemical cell sub-assembly comprising:
   a. a current collector sheet having a pair of opposite surfaces and a pair of opposite edges, each surface being coated with a respective layer of electrode material; and
   b. a layer of polymer electrolyte completely enveloping both layers of electrode material and one of the pair of opposite edges of said current collector sheet, thereby encapsulating the one edge of said current collector sheet while leaving exposed the other edge of said current collector sheet.

* * * * *